Jan. 21, 1964 W. H. LYON 3,118,679

DICTATION RECORDING AND REPRODUCING APPARATUS

Filed July 5, 1960 10 Sheets-Sheet 1

INVENTOR
William H. Lyon
BY
Blair, Spencer & Buckles
ATTORNEYS

INVENTOR.
William H. Lyon
BY
Blair, Spencer & Buckles
ATTORNEYS

INVENTOR.
William H. Lyon
BY
Blair, Spencer & Buckles
ATTORNEYS

DICTATION RECORDING AND REPRODUCING APPARATUS

INVENTOR
William H. Lyon
BY
Blair, Spencer + Buckles
ATTORNEYS

Jan. 21, 1964 W. H. LYON 3,118,679

DICTATION RECORDING AND REPRODUCING APPARATUS

Filed July 5, 1960 10 Sheets-Sheet 5

INVENTOR
William H. Lyon
BY
Blair Spencer & Buckles
ATTORNEYS

Jan. 21, 1964 W. H. LYON 3,118,679

DICTATION RECORDING AND REPRODUCING APPARATUS

Filed July 5, 1960 10 Sheets-Sheet 6

INVENTOR.
William H. Lyon
BY
Blair, Spencer + Buckles
ATTORNEYS

Jan. 21, 1964 W. H. LYON 3,118,679
DICTATION RECORDING AND REPRODUCING APPARATUS
Filed July 5, 1960 10 Sheets-Sheet 7

INVENTOR
William H. Lyon
BY
Blair, Spencer & Buckles
ATTORNEYS

INVENTOR
William H. Lyon
BY
Blair, Spencer + Buckles
ATTORNEYS

INVENTOR

William H. Lyon

BY

Blair, Spencer & Buckles

ATTORNEYS

INVENTOR
William H. Lyon
BY
Blair, Spencer & Buckles
ATTORNEYS 3,118,679
Patented Jan. 21, 1964

3,118,679

DICTATION RECORDING AND REPRODUCING APPARATUS

William H. Lyon, Orange, Conn., assignor to The Soundscriber Corporation, North Haven, Conn.

Filed July 5, 1960, Ser. No. 40,913
20 Claims. (Cl. 274—9)

This invention relates to automatic recorder-reproducer machines and systems; more particularly, certain aspects of the invention are incorporated in recorder-reproducer dictating machines which may be operated from local and remote control stations.

In conventional groove or magnetic recording machines, it is often very difficult to locate a particular portion of a recording for selective playback. This generally requires the operation of several different controls to position the playback transducer member relative to the record. Additional controls must then be operated to initiate playback. Indeed, several successive samplings of the recording are often required before the desired portion is located.

Furthermore, in conventional groove recording machines, manual positioning of the pickups is often necessary. Several attempts are usually required to locate a desired portion of the recording. Such manual positioning of the pickup stylus upon a grooved record may damage individual grooves or destroy the groove pattern entirely. This increases distortion and background noise, reducing intelligibility. Often groove skipping results and whole portions of the record are lost.

In tape machines, improper operation of the many controls for selective playback often results in accidental erasure of the recording. Also, the prevalent "tape spill" resulting from inexpert operation of these controls often leaves the operator with an unreeled and tangled recording.

Similar difficulties are often encountered in repositioning the record member for subsequent recording. Either continuous playback of the previous recording or numerous selective playback operations are generally required to locate the end of the previous recording, where new recording is to begin. The operator may waste considerable time in locating the point at which previous recording ended, in order to avoid double-recording on the record or an undesirable hiatus in the recording. In tape machines, double recording results in the loss of a portion of the prior recording.

Various kinds of centralized dictation systems have been proposed in which dictation originating at remote stations is recorded by a centrally-located recording machine. With such systems, playback of a selected portion of a recording upon command from a remote station has been difficult or impossible. The rapid scanning and playback sampling operations required for selective playback have generally required the continuous attendance of a local operator at the central recording machine.

Thus there has long been a need for a fully-automatic dictating system in which selective retrieval of recorded information was possible and convenient, from either local or remote control stations. Furthermore, an operator at such a remote station should be able to play back selected portions of the recording conveniently. He should then be able to renew dictation without delay.

Accordingly, a principal object of the present invention is to provide recorder-reproducer machines and systems affording convenient and automatic selective retrieval of recorded information.

Another object of the invention is to provide recorder-reproducer machines and systems of the above character affording convenient and automatic remote control of selective retrieval.

A further object of the invention is to provide systems and apparatus of the above character affording automatic repositioning of transducer means to provide scanning, selective playback, and subsequent renewed recording while maintaining continuity of recorded information.

Another object of the invention is to provide systems and apparatus of the above character having a minimum number of separate controls at both local and remote control positions.

A further object of the invention is to provide disk dictating apparatus employing a movable and fully-automatic stylus-supporting carriage having a normal forward drive for indexing feed of a recording stylus, and rapid scanning overdrive in both forward and reverse directions for convenient selective playback.

Another object of the invention is to provide apparatus of the above character incorporating position control means for said transducer-supporting carriage, permitting rapid-scan reverse repositioning for selective retrieval and corresponding rapid-scan forward repositioning with subsequent recording continuity.

A further object of the invention is to provide apparatus of the above character affording automatic repositioning of the transducer-supporting carriage upon completion of a recording operation in preparation for succeeding operations.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 21 is a schematic circuit diagram of the controls and switching circuits employed with one embodiment of the present invention.

Similar reference characters refer to similar parts throughout the several views of the drawings.

Figure 1:
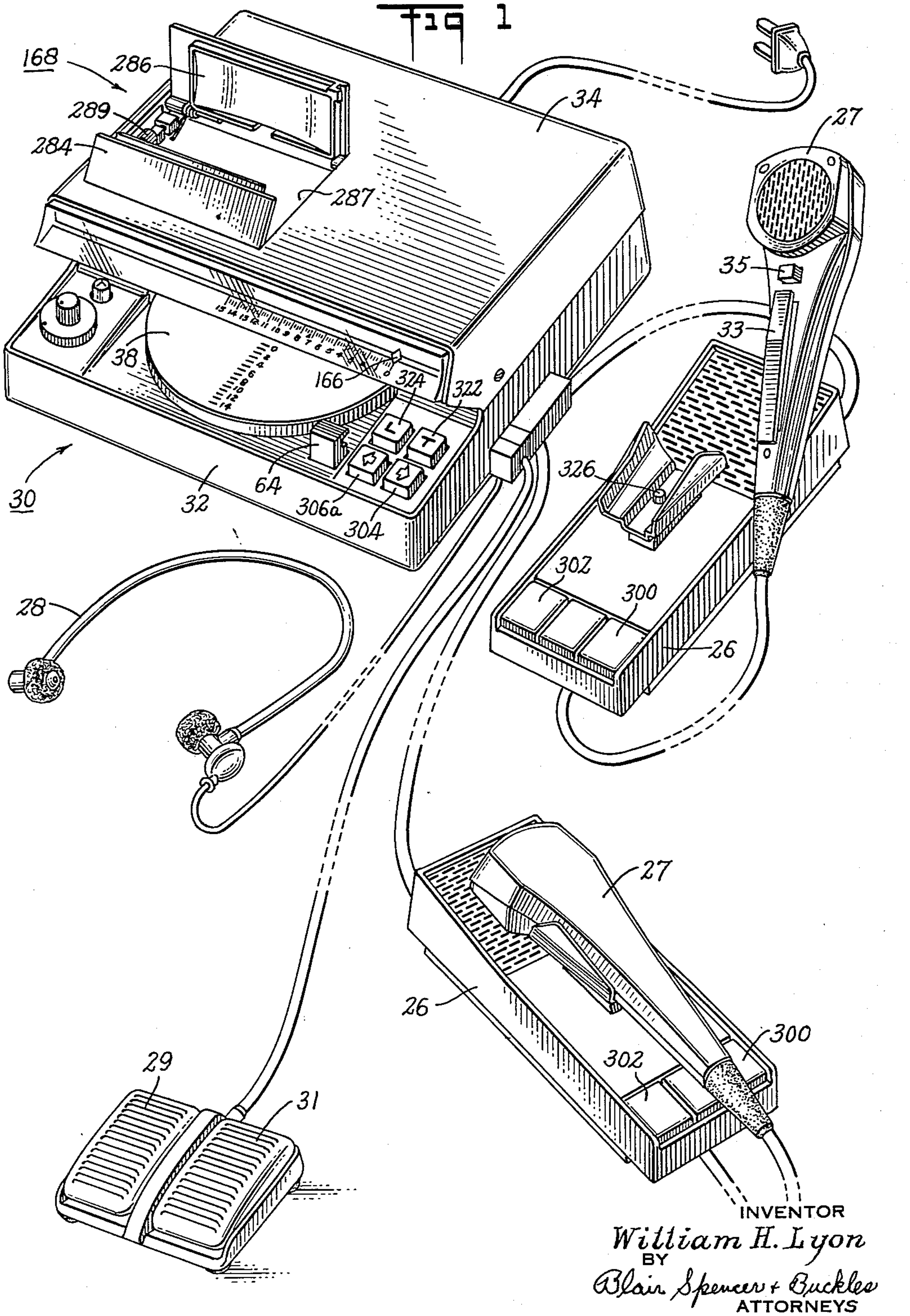
FIGURE 1 is an over-all perspective schematic view of a system of the present invention incorporating a recorder-reproducer unit, two remote dictating and control stations, and transcribing accessories.

Referring first to FIGURE 1, a recorder-reproducer system incorporating the present invention is there shown to include a disk dictation recorder and playback unit 30 connected to a plurality of remote stations 26, each having a microphone 27 mounted thereon. The recording and playback unit 30 is also provided with a stenographic earphone 28, a start pedal switch 29 and a back-space pedal switch 31 to be used by the transcribing typist. The remote stations 26 are preferably installed at remote dictation points in separate rooms, and each remote station with its associated microphone provides all control buttons needed for remote operation of the system, including recording, repositioning for selective retrieval of recorded information, and subsequent recording without interrupting the continuity of recorded information. Thus the microphone 27 is provided with a combined stop-start and "quick review" control 33, and an indexing button 35, all more fully described below. The remote station 26 provides the two principal remote controls: a "listen" key 302 for selective playback, and a "talk" key 300 for returning the system to recording condition. The operation of these remote controls is fully described below.

The recording and playback unit 30 incorporates as local controls a "T" button 322 for placing the apparatus in condition to record remote dictation, and an "L" button 324 for local playback, and rapid scan buttons 304 and 306*a*. The unit 30 contains all mechanisms required for these selective retrieval operations, including the record disk-supporting turntable, the transducer stylus assemblies and movable supporting carriage, the drive mechanisms, solenoids, relays, and all manual controls required for local operation of the system.

Figures 4, 5:
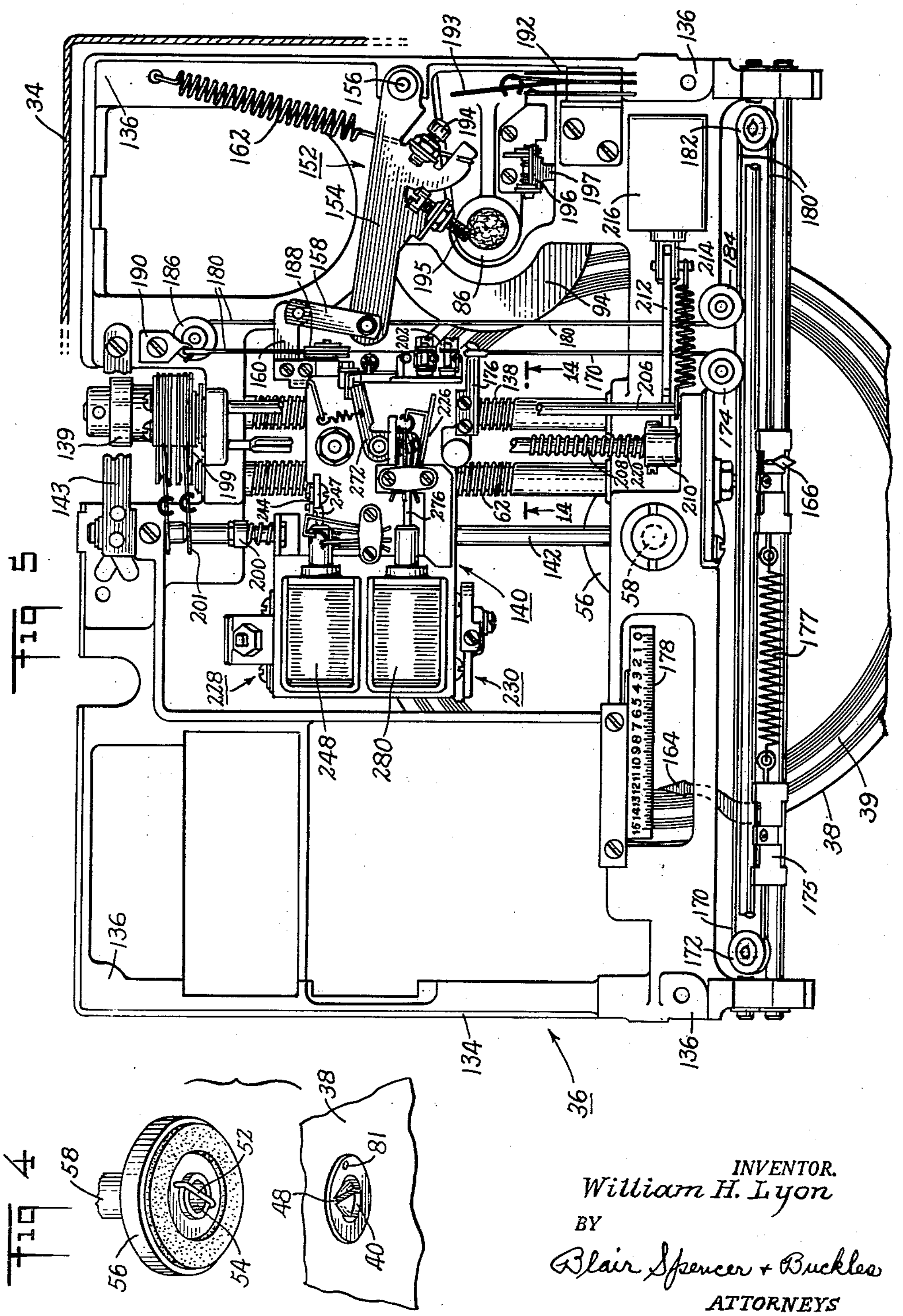
FIGURE 4 is an enlarged fragmentary perspective view of the turntable spindle assembly.
FIGURE 5 is a top plan view of the transducer-carriage and the supporting bridge assembly of the apparatus.
Figures 9, 10, 11:
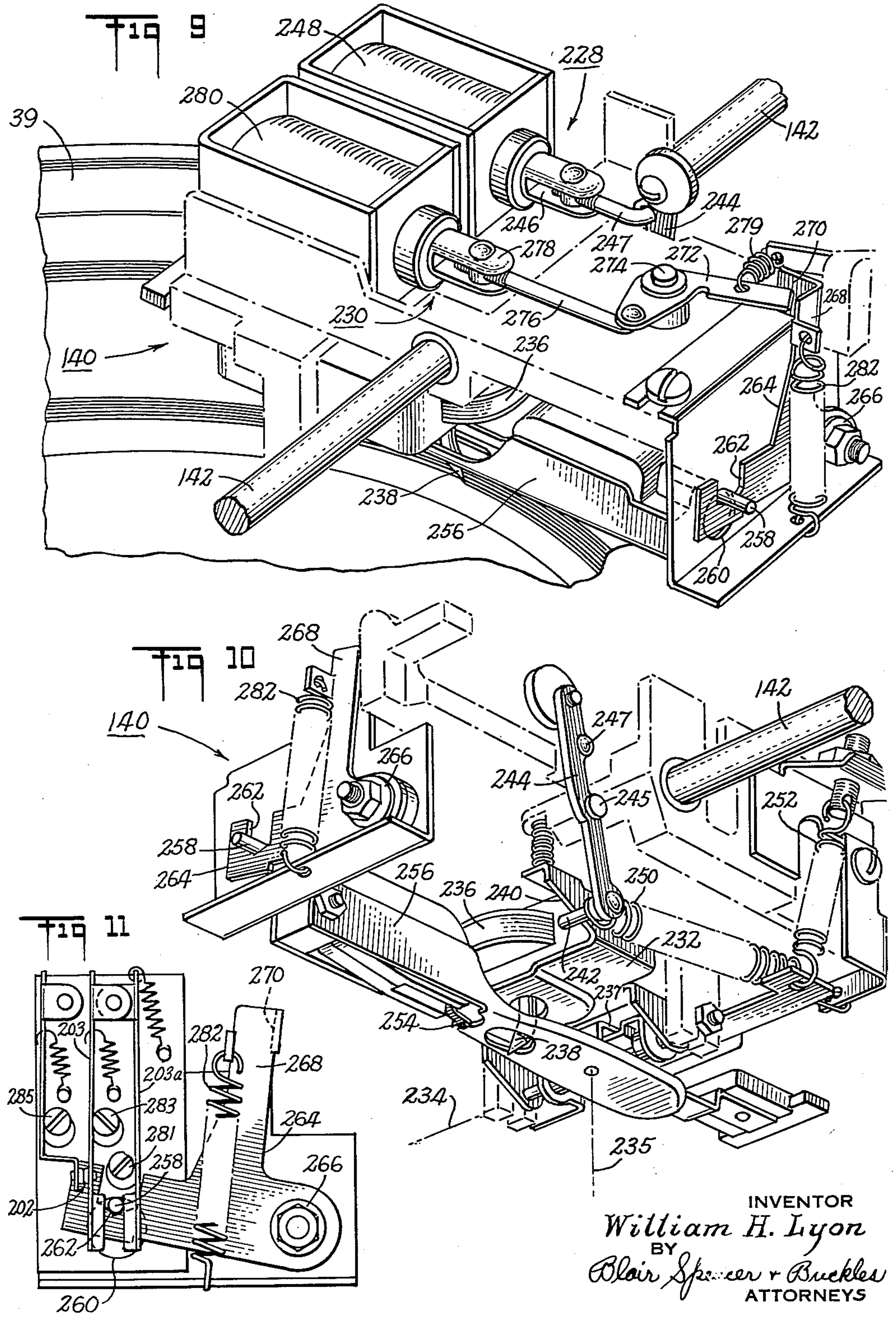
FIGURE 9 is a perspective view of the top and front of the transducer-supporting carriage.
FIGURE 10 is a perspective view of the underside and rear of the carriage shown in FIGURE 9.
FIGURE 11 is a fragmentary end view of the carriage shown in FIGURES 9 and 10.
Figures 12, 13, 14:
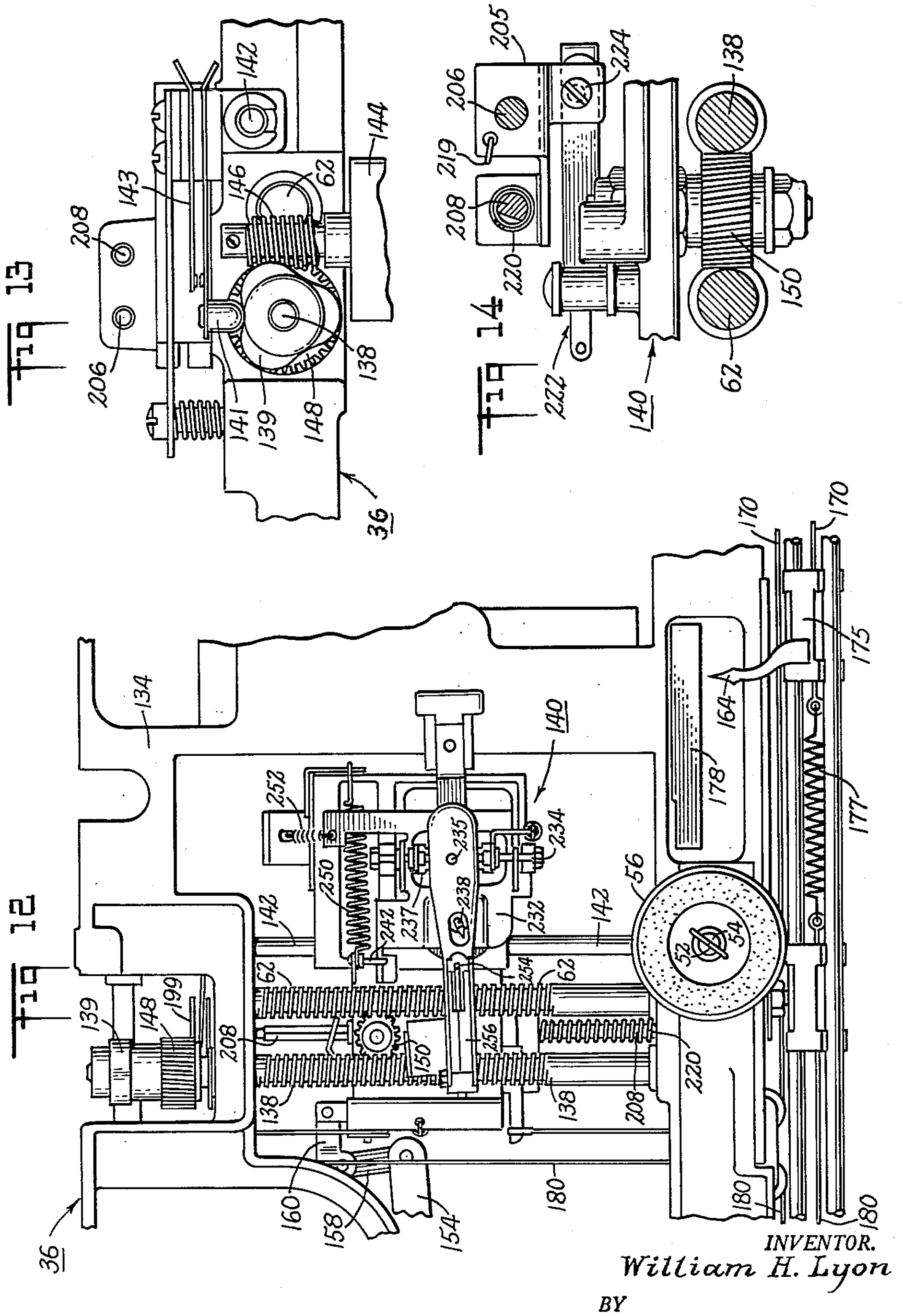
FIGURE 12 is a fragmentary bottom view of the underside of the bridge and carriage assembly shown in FIGURE 5.
FIGURE 13 is a fragmentary rear elevation view of another portion of the mechanism shown in FIGURES 5 and 12.
FIGURE 14 is a fragmentary vertical sectional view of the driving elements used for positioning the transducer-supporting carriage relative to the turntable, taken along the line 14—14 in FIGURE 5.

The record disk-supporting turntable 38 and its drive mechanism are shown in FIGURES 2–8. As shown in FIGURES 5, 10, and 12, the recording stylus 238 and the playback stylus 254 are separately supported on a slidable carriage 140 which moves radially across the turntable 38, carrying the styli from the outside toward the center of the record disk. The carriage 140 is moved and repositioned by the operation of two feed screws, a normal drive feed screw 62 and a control screw 138. The main drive screw 62 is coupled directly to the turntable to provide normal forward feed of the styli whenever the turntable is revolving. The control screw 138 may be driven forward or backward at a more rapid rate by the operation of a separate control motor 144 positioned at the rear of the machine and shown in FIGURES 2 and 13. The traversing movement of the carriage 140 is limited by a forward limit switch 192 (FIGURE 5) and a reverse limit switch 199 (FIGURES 5 and 12).

The unique stylus carriage feed and repositioning arrangement employing the two feed screws 62 and 138 eliminates the need for any clutching and unclutching mechanisms, and provides a simplified and dependable mode of operation well adapted for convenient selective playback from either local or remote control stations.

Repositioning of the stylus 238 for renewed dictation following selective retrieval is aided by a memory slider mechanism shown in FIGURES 15–18. The memory slider 205 is moved ahead of the advancing carriage 140, but the slider 205 is clamped against reverse movement. When the carriage is moved backward for selective playback, the memory slider remains in its advanced forward position. When the carriage 140 is moved rapidly forward to return it to recording condition, a switch arm 222 on the carriage 140 is actuated by contact with a stud 224 on the memory slider 205 to stop the rapid forward movement of the carriage 140 at the exact end of previous recording. Convenient and automatic positioning of the recording stylus thus achieves complete continuity of recorded information while facilitating selective playback as often as desired during and between recording operations.

*Turntable-Stylus Drive*

Recorder-reproducer unit 30 includes a base 32 and a top cover 34 as shown in FIGURE 1. The base 32 houses the drive motor and the amplifier and power supply circuits for the system. The top cover 34 encloses the stylus carriage supporting bridge assembly 36 shown in FIGURE 5, which is positioned above the base 32 to place the stylus carriage 140 in operating position above the turntable 38.

The main drive mechanism for the turntable 38 and the main drive screw 62 is shown in FIGURES 2–8. The turntable 38 supporting the recording disk 39 is secured on a central spindle 40 which is mounted for rotation and for vertical movement within a bushing 42, positioned within a base socket 44 formed in the base 32.

Figures 2, 3:
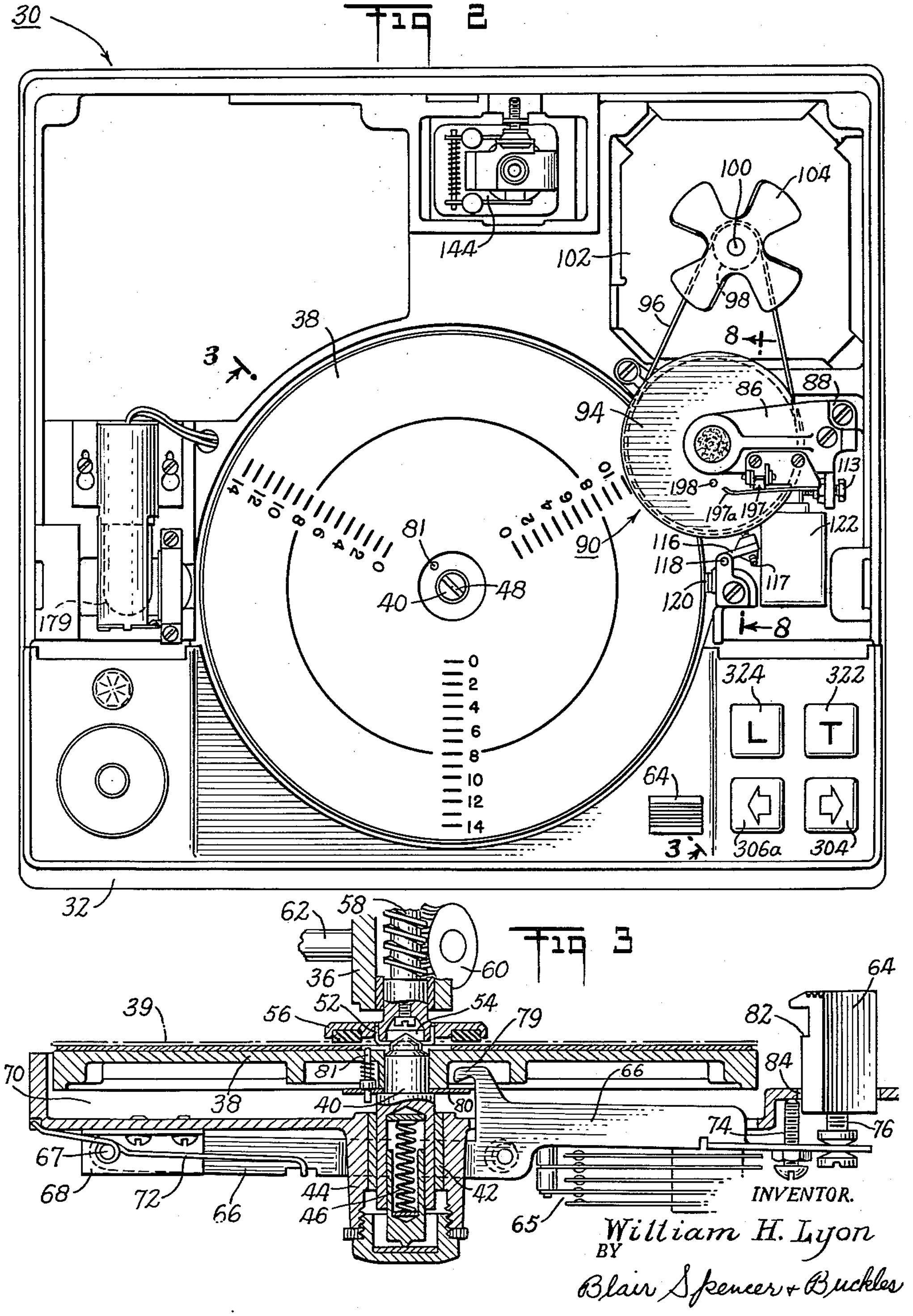
FIGURE 2 is a horizontal plan view of the recorder-reproducer unit unit shown in FIGURE 1 with its cover and transducer assemblies removed to show the record-supporting turntable and motor drive mechanism.
FIGURE 3 is a fragmentary diagonal sectional elevational view showing the turntable and the associated mechanism for inserting and removing recording disks therefrom, taken along the line 3—3 of FIGURE 2.

As shown in FIGURE 3, the turntable mounting mechanism in socket 44 permits the turntable to be moved a short distance upward and downward, to permit the changing of the recording disk 39. The central turntable spindle 40 is urged upwardly in bushing 42 by a resilient coil spring 46, to bring a transverse notch 48 formed in the upper end of the spindle 40 (shown in FIGURES 2 and 4) into engagement with a transverse torque rod or wire 52 spanning a central recess 54 formed in the underside of a rotatable drive disk 56 (FIGURES 3–5 and 12). The drive disk 56 is positioned above the turntable spindle 40 and drivingly secured to a rotatable worm shaft 58 journaled for rotation in the front portion of the bridge 36 (FIGURE 3). The worm 58 drives a pinion 60 keyed on the main drive screw 62, which extends from front to rear across the bridge 36 and is journaled to revolve about its axis to provide forward indexing movement of the carriage 140 as described below. In the normal operating position of turntable 38 shown in FIGURE 3, the rotation of the turntable produces corresponding rotation of the drive screw 62 via the torque rod 52, the worm 58, and the pinion 60.

Lowering of the turntable 38 for insertion of a new recording disk 39 is achieved by the mechanism shown in FIGURE 3. A re-set or load button 64 positioned at the right front of the base 32 is connected to the forward end of a turntable lowering arm 66 pivotally mounted at point 67 on a bracket 68 secured to the underside of a turntable recess 70 formed in the base 32. A resilient spring 72 acting against base 32 urges the lowering arm 66 upwardly, bringing the load button 64 to its normal upper position shown in FIGURE 3, governed by a set screw 74 and the adjustable threaded member 76 joining button 64 to arm 66. An upwardly-projecting hook 79 formed on arm 66 engages an annular flange 80 projecting from spindle 40 beneath turntable 38. When load button 64 is depressed, pivoting the lowering arm 66 about the pivot point 67 on bracket 68, the resulting downward movement of the hook 79 acting on the flange 80 draws spindle 40 and turntable 38 downwardly against the action of the springs 46 and 72. The resulting downward movement of turntable 38 leaves disk-ejector pin 81 projecting above the turntable, raising disk 39 for free withdrawal over spindle 40.

A ledge 82 formed in the rear face of the load button 64 engages the rear edge of the base aperture 84 in base 32 within which the load or re-set button 64 is positioned for vertical movement, and ledge 82 therefore holds in their lowered positions the load button 64, the lowering arm 66, and the spindle 40 and turntable 38. Downward movement of the load or re-set button 64 and the lowering arm 66 also operates the load switch 65, actuating the necessary control elements to return the carriage 140 to its initial position at the outside of turntable 38, and thus placing the machine in condition for the next recording operation.

The downwardly-withdrawn position of turntable 38 within the recess 70 disengages its connection with the drive disk 56, permitting removal of the recorded disk 39 and insertion of a fresh disk. Subsequent depression and forward urging of the load or re-set button 64 by the local operator releases the ledge 82 from engagement with the aperture 84, allowing springs 46 and 72 to urge the turntable 38 upwardly until spindle slot 48 engages the torque rod 52, restoring the driving connection between the turntable and drive screw 62 as shown in FIGURE 3 for synchronized stylus feed. If slot 48 and torque rod 52 should be out of alignment, the turntable will move upward into position as soon as it begins to revolve. The fresh disk is guided down and centered on tapered spindle 40 by the urging of torque rod 52.

*Turntable Idler and Brake*

Figures 6, 7, 8:
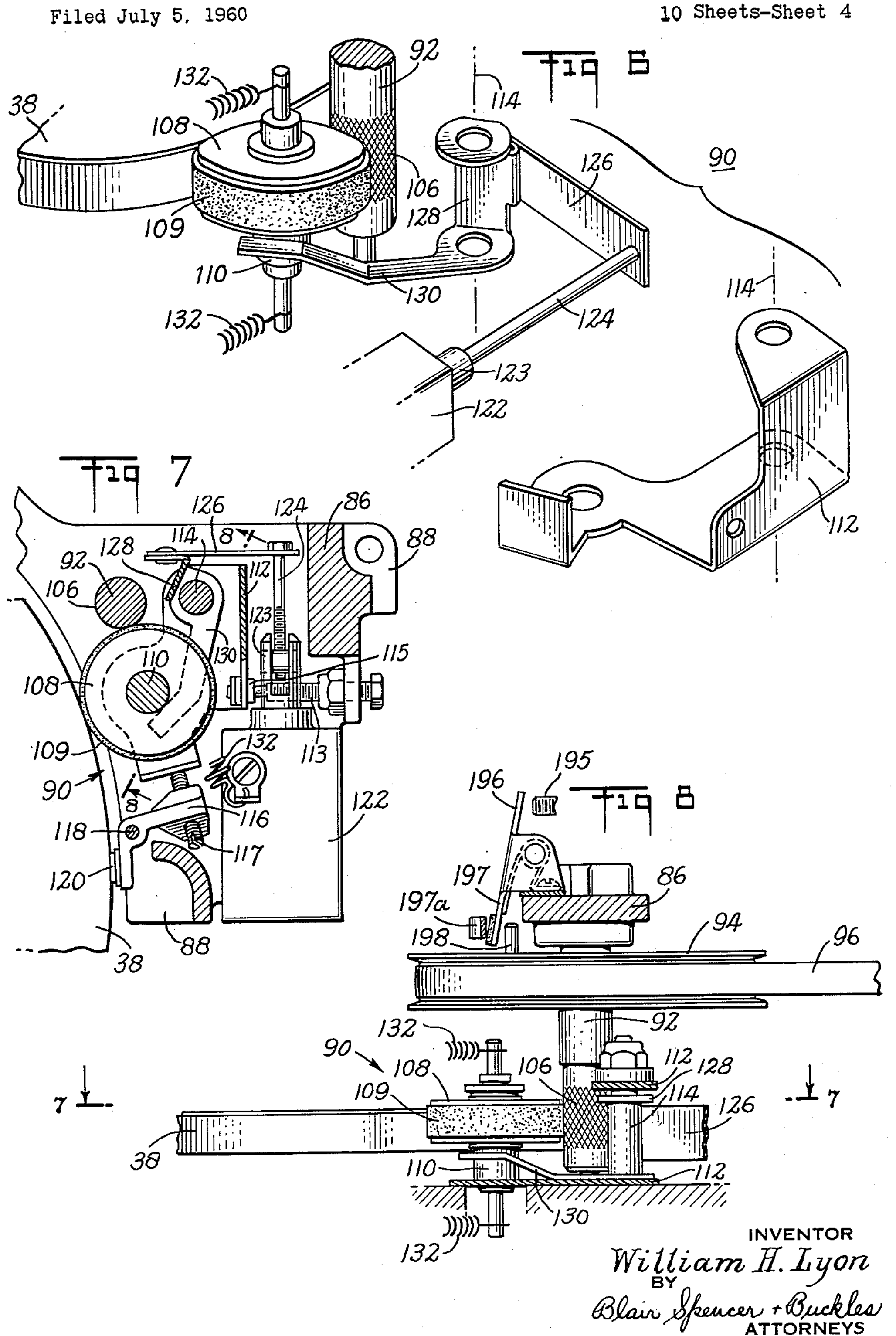
FIGURE 6 is an exploded perspective view of the turntable idler drive assembly and its actuating mechanism.
FIGURE 7 is a fragmentary top plan view of the turntable idler drive mechanism and the stop-start idler solenoid.
FIGURE 8 is a vertical sectional elevation view of the assembly shown in FIGURE 7, taken along the line 8—8 of FIGURE 2.

An idler-supporting frame 86 is mounted on base 32 beside turntable 38 on mounting pads 88, as shown in FIGURES 2, 7, and 8. A drive idler mechanism is mounted in frame 86 and generally indicated at 90 in FIGURES 2 and 6–8. This idler mechanism conveys drive power from the drive motor 102 to the turntable 38 and thence to the main drive screw 62 for normal feed indexing of stylus carriage 140.

The idler mechanism 90 includes an idler shaft 92 (see FIGURES 6, 7 and 8) journaled in the idler frame 86 and having secured on its upper end a drive sheave 94 joined by a belt 96 to a corresponding sheave 98 (FIGURE 2) on the driven shaft 100 of the main drive motor 102. A cooling fan 104 is also mounted on the motor shaft 100, as shown in FIGURE 2.

Returning to FIGURES 6–8, the idler shaft 92 has a lower knurled portion 106, and a drive wheel 108 is rotatably and pivotally mounted adjacent this knurled portion 106 for engagement therewith. As shown in FIGURE 7, the drive wheel 108 is also in frictional engagement with the rim of the turntable 38, and thus transmits the rotary motion of idler shaft 92 to the turntable. The drive wheel 108 is preferably provided with a traction rim 109 for most effective driving engagement with the idler shaft 92 and the periphery of turntable 38.

As shown in FIGURE 7, a radial plane of drive wheel 108 defined by its axis of rotation and its point of tangency with the idler shaft 92 is substantially perpendicular to a second radial plane defined by the same axis of rotation of the drive wheel 108 and its point of tangency with the turntable 38. This perpendicular relationship minimizes the vibrations which might otherwise be generated by the drive wheel 108, and takes full advantage of the flywheel inertia effect of the relatively heavy drive sheave 94 and shaft 92.

The idler drive wheel 108 is rotatably mounted on a pin 110 journaled in a yoke 112 which itself is pivotally mounted on the post 114 projecting upward from the idler-supporting frame 86. A brake crank 116 (FIGURE 7) is pivotally mounted on the idler frame 86 via a second pin 118 positioned to place a brake shoe 120 on brake crank 116 against the rim of turntable 38 in operative position for slowing and stopping the turntable 38 when desired. An adjustable stud 117 mounted on the brake crank 116 is positioned to be urged counterclockwise by the action ofthe yoke 112, so that withdrawal of idler wheel 108 from its engaged driving position automatically pivots brake crank 116 counterclockwise about pin 118 to stop the turntable 38 with a minimum of coasting rotation.

Automatic engagement of the idler mechanism is achieved by the operation of an idler solenoid 122 shown in FIGURE 7. The plunger 123 of the idler solenoid is connected to a plunger link 124 joined to an arm 126 of an actuating crank 128 pivoted about the post 114 and having a forwardly-projecting finger 130 positioned to engage the pin 110 carrying idler wheel 108.

When solenoid 122 is energized, the plunger link 124 draws arm 126 of the crank 128 clockwise (FIGURE 7) about the post 114 and the resulting clockwise movement of the finger 130 urges the idler wheel pin 110 and its supporting yoke 112 clockwise about the same post 114 against the urging of the resilient springs 132 (FIGURE 8) until drive wheel 108 engages both the idler shaft 92 and the turntable 38. The same clockwise movement of the yoke 112 actuates a "muting" switch 115 positioned between yoke 112 and an adjustable stop 113, placing the amplifier in operation, and also releases the pressure on brake crank 116, and brake shoe 120 therefore cannot impede the rotation of turntable 38 when the solenoid 122 is energized. De-energization of the solenoid allows the springs 132 to draw the yoke 112 counterclockwise about post 114 withdrawing the idler wheel 108 from its engaged position and applying the pressure of brake shoe 120 to stop the turntable 38 with prompt braking action.

It will be noted that various adjustable elements are provided in this brake linkage to produce optimum driving and braking operation. These include the adjustable stop 113 cooperating with the yoke 112, the adjustable threaded engagement between the solenoid plunger 123 and the plunger link 124, and the adjustable stud 117 in brake crank 116.

*Double Drive Screw Assembly*

As shown in FIGURE 5, the bridge assembly generally indicated at 36 is mounted within the top cover 34 above the turntable 38. Bridge 36 supports the stylus carriage 140 for indexed radial movement across the turntable 38.

The bridge 36 includes a generally-rectangular frame 134 secured by its mounting corners 136 to the base 32. The bridge frame 134 provides journaled support for two feed screws 62 and 138 and a parallel rod 142 spans the bridge 36 and slidably supports the stylus carriage 140 for backward and forward traversing movement across the bridge. The main drive screw 62 is journaled for rotation on the bridge frame 134 and is driven by the pinion 60 and the worm 58 as shown in FIGURE 3. Overdrive control screw 138 is likewise journaled spanning the bridge 36 parallel to the drive screw 62 and the rod 142. The carriage 140 is positioned above the two feed screws 62 and 138 with the carriage drive pinion 150 rotatably depending beneath the carriage 140, as shown in FIGURE 12, and engaged with both feed screws 62 and 138 for normal forward feed and overdrive scanning movement of the carriage 140 as hereinafter described.

The overdrive control screw 138 is rotated by a separate control motor 144 (FIGURES 2 and 13) mounted at the rear of bridge frame 134, and motor 144 drives a control worm 146 meshed with a control pinion 148 mounted on the control screw 138. In one embodiment of the invention, a three-lobed cam 139 (FIGURE 13) is mounted on the control screw 138 adjacent the control pinion 148, and the cam 139 cooperates with a cam follower 141 connected to actuate a cam switch 143 (FIGURE 13) interposed in the circuit of the control motor 144 to provide one-third of a revolution of feed screw 138, thus producing a preselected increment of indexing motion of stylus carriage 140, to provide a short rapid "index" spiral separating different bands of dictation on the disk 39, thus indicating different letters or memoranda to be separately transcribed. Similar incremental actuation of the control motor 144 may be accomplished by a time-delay capacitor discharge circuit, as described below.

The stylus carriage 140 is shown in perspective in FIGURES 9 and 10 and its driving connection with the two feed screws is most clearly shown in FIGURES 12 and 14. For normal indexing feed of the stylus carriage 140 across the turntable from its outer edge toward its center, to provide normal recording and normal playback operation, the control screw 138 is stationary and the main drive screw 62 is driven as previously described. The rotation of the turn table 38 and the resulting rotation of feed screw 62 through the operation of the torque rod 52, worm 58, and pinion 60 causes the carriage drive pinion 150 in mesh with both feed screws to rotate slowly along the control screw 138, which now acts as a rack. The resulting traversing movement of the carriage drive pinion 150 along the control screw 138 draws the stylus carriage 140 slowly across the turntable, providing normal feed for the styli. In the preferred embodiment of the machine, some 274 revolutions of the turntable are required to advance the stylus carriage 140 by one inch of its travel.

Overdrive rapid scanning movement of the stylus carriage 140 is provided by actuation of the reversible overdrive control motor 144. Operation of the control motor in the "reverse" direction provides rapid reverse rotation of the control screw 138 at a much faster speed than the normal drive rotation of the feed screw 62. The carriage drive pinion 150 therefore finds itself rotated along the main drive screw 62, which now acts as a rack, producing rapid reverse scanning movement of the stylus carriage 140.

After playback of a selected portion of the recording, rapid forward scanning of the carriage is produced by "forward" operation of the motor 144, producing rapid "forward" rotation of the overdrive control screw 138, thus returning the carriage 140 at its rapid scanning rate toward the end of the previously-recorded information.

The use of two parallel feed screws with a common meshing drive pinion 150 permits independent operation of each screw, and eliminates all need for clutching and unclutching connection of the drive and control motors with the stylus carriage. In the preferred switching circuits employed with the machines of the present invention, the idler solenoid 122 (FIGURES 6 and 7) is deenergized by the initiation of rapid scanning traverse in either direction, leaving the turntable 38 and main drive screw 62 stationary during scanning operation of the control screw 138 to produce rapid scanning movement of the carriage 140. The independently-driven screws 62 and 138 may rotate simultaneously, however, and the pinion 150 then adds or subtracts their speeds and is traversed by their totaled speeds. The brief rapid advance "index" spiral employed to produce separate bands of recorded information is preferably produced by a small rotation of the control screw while the main drive screw continues its normal rotation, thus taking advantage of the true overdrive operation made possible by the independent double drive screw arrangements of this invention.

An anti-backlash linkage generally indicated at 152 (FIGURE 5) is provided to urge the carriage rearwardly and compensate for any play in the drive screw and pinion mechanism. This linkage includes an arm 154 pivotally mounted upon a pin 156 at the extreme edge of bridge frame 134 and joined by a pivoted link 158 to a carriage projection 160 on the carriage 140. A tension coil spring 162 joins the pivoted link 154 to a portion of the bridge frame 134 and urges the link 154 clockwise to draw the carriage rearwardly against any slack in its driving mechanism.

*Position Indicators*

In the combination version of the dictating machines of the present invention intended for use both for local dictation and transcription, two carriage position indicators are incorporated, as shown in FIGURE 5. An interior position indicator 164 is viewed through a double mirror arrangement 168 (FIGURE 1) installed in aperture 287 in the top cover 34 and hereinafter described in more detail. Refering again to FIGURE 5, the internal indicator 164 is moved from left to right during traversing forward movement of the carriage 140 by the action of a cord 170 passing over the pulleys 172 and 174 mounted on the forward portion of the bridge. The cord 170 connects an indicator slide 175 to a projecting finger 176 mounted on the carriage 140. Forward movement of the carriage from its rearmost position towards the front of the machine allows a coil spring 177 to draw the indicator 164 toward the right along the scale 178. A lamp 179 (FIGURE 2) mounted above the scale 178 illuminates the indicator, the scale, and the underlying recording disk 139, all three of which can be viewed in the mirror viewer 168. The lamp 179 is positioned at the left end of scale 178 to provide oblique illumination for the indicator, the scale and the record, affording a clear view of the separate grooves and bands of recorded information beneath the scale and indicator by way of the double mirror viewing arrangement 168 hereinafter described. A second position indicator 166 is positioned to be viewed at the front of the machine, and it is similarly mounted to be drawn from left to right by the movement of the carriage 140. Traversing movement of the indicator 166 is produced by the action of a cord 180 passing over two fixed pulleys 182 and 184 on the front portion of the bridge frame 134 thence to a fixed pulley 186 mounted at the rear of frame 134, and then forwardly around a pulley 188 mounted on the carriage 140 and back to a fixed frame hook 190 on the frame 134, all as shown in FIGURE 5. The use of the pulley 188 produces a double increment of movement of the indicator 166 for each single increment of carriage 140.

Simplified models of the recorder-reproducer machines of the present invention may include only one of the two indicators 164 or 166. Simplified machines for use purely for playback by a transcribing typist will include only the internal indicator 164, while machines made primarily for local dictation will normally include only the indicator 166. In either case, the unused end of the tension coil spring 177 is secured to the bridge 134 to provide the same indicating operation of the single indicator used.

*Carriage Control Mechanisms*

Still referring to FIGURE 5, forward traversing movement of the carriage 140 across the bridge is limited by a forward limit switch 192 installed on the right front portion of the bridge frame 134 and having an actuating arm 193 positioned to be actuated by an adjustable stud 194 mounted on the pivoted arm 154. Various warning devices may be provided to warn both local and remote operators of the approaching end of the recording capacity of the disk being recorded. For example, as shown in FIGURES 5 and 8, an adjustable stud 195 mounted on the pivoted arm 154 is positioned to contact the finger 196 on a spring-restrained arm 197, urging the reed 197a into the path of a rotating upwardly-projecting pin 198 on the drive sheave 94, producing an increasingly audible click with each rotation of the drive sheave 94 as the carriage 140 approaches the end of its forward travel. Furthermore, a second forward limit switch similar to switch 192 may be actuated by another such adjustable stud as element 194 or 195 to produce a humming tone or a flashing light at the remote station to warn the operator there that the end of the recording disk is closely approaching. When a convenient stopping point is reached, a new disk may be inserted by the local operator in a very brief interval and recording may begin once more.

For limiting rearward traversing movement of stylus carriage 140, a rear limit switch 199 is mounted at the rear of the frame 134 above the overdrive pinion 148 (FIGURE 12), and is actuated by a finger 200 mounted at the rear of carriage 140 and positioned to actuate an actuator arm 201 of the switch 199.

A pair of spring-urged guide arms 203 and 203a are pivotally mounted on the end of carriage 140 as shown in FIGURE 11 and employed for guiding the position of the playback stylus 254 as hereinafter described. A carriage sensing switch 202 is actuated by the operation of the guide arm 203 to provide forward indexing motion, for synchronizing the forward tracking of carriage 140 with any rapid advance "index" spirals between bands of recorded information, as hereinafter described.

A "memory slider" 205, shown in FIGURES 15–18, is mounted on two slider rods 206 and 208 spanning the bridge 36 above the drive screw 62 and the overdrive control screw 138. Slider rod 208 is a pivotal member, being journaled at both ends in the bridge frame 134 for a pivotal movement about its own axis when actuated by a slider crank 210, a slider link 212, and a plunger 214 of memory solenoid 216.

The memory slider 205 is held in any adjusted position along the rods 206 and 208 by a wedging grip stop 218, clamped to the slider 205 by a coil spring 219 urging the stop 218 toward the body of slider 205. When the pivotal rod 208 is pivoted by the operation of memory solenoid 216, the grip stop 218 loses its grip on the rod 208 and a compression coil spring 220 surrounding the pivotal rod 208 betwen the slider crank 210 and the slider 205 is thereafter free to push the slider toward the rear of the machine until a stud 224 mounted beneath the slider 205 comes into contact with an actuator arm 222 of a carriage follow switch 226 mounted on the carriage 140.

Figures 15, 16, 17:
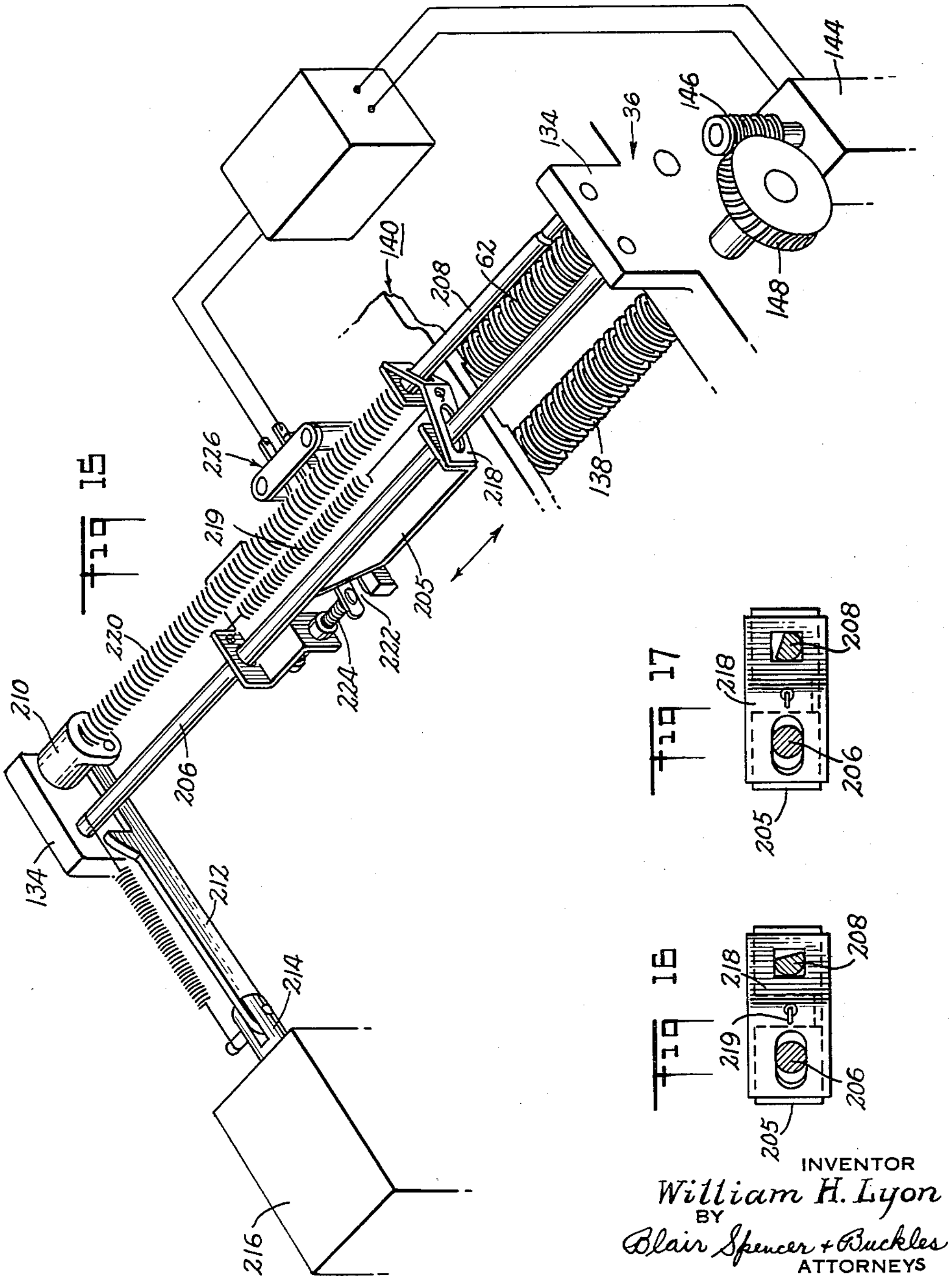
FIGURE 15 is a fragmentary perspective view of the "memory slider" assembly employed for controlling rapid forward scanning movement of the transducer carriage.
FIGURES 16 and 17 are fragmentary rear end views of the memory slider assembly.
Figure 18:
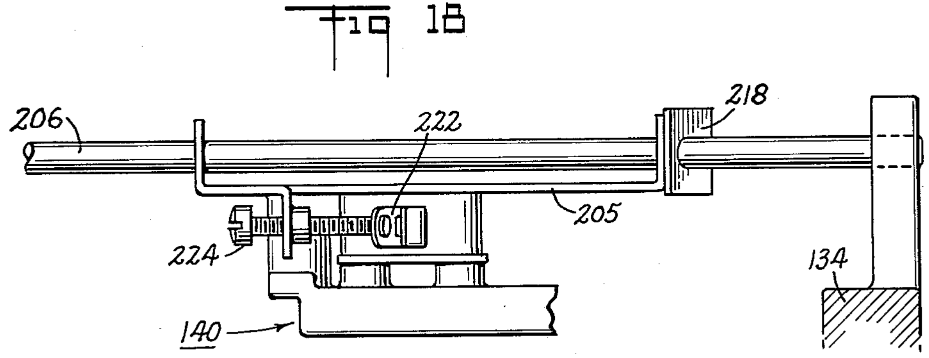
FIGURE 18 is a fragmentary side elevation view of the memory slider assembly shown in FIGURE 15.

The arm 222 pushes slider 205 forward by pressure on stud 224, and the advancing carriage 140 thus pushes the memory slider 205 toward the front of the machine ahead of the carriage 140 during its forward movement (FIGURES 14, 15 and 18). The slider 205 is clamped in each successive forwardmost position by the grip stop 218. When carriage 140 is rapidly traversed rearwardly by the operation of overdrive control screw 138, the slider 205 remains in its forwardmost position, held in place by the grip stop 218 while the carriage is moving backward for selective playback, and while it is moving forward again to resume recording. Arrival of the forwardly-moving carriage beneath the slider 205 brings actuator arm 222 into contact with the adjustable stud 224 on the slider 205, and the resulting movement of arm 222 opens the carriage follow switch 226 to stop the forward movement of the carriage and place the machine in recording condition.

When a recording disk has been completely filled, the operation of the load or re-set button 64 (FIGURE 1) initiates "reverse" rotation of the overdrive control screw 138 to return the carriage 140 to its starting position at the rear of the carriage, and also actuates memory solenoid 216, pivoting the rod 208 to allow the slider 205 to return to its rearmost position in readiness for the next recording disk.

*Stylus Control Mechanisms*

Referring now to FIGURES 9 and 10 the stylus carriage 140 provides traversing support for two stylus assemblies, a recording stylus assembly 228 and a playback stylus assembly 230, both preferably mounted for pivotal movement about a common axis 234. Recording stylus assembly 228 includes a recording stylus arm 232 best seen in FIGURES 10 and 12, on which is mounted a transducer winding 236 surrounding a recording stylus 238, positioned for embossing a record member 39.

Referring now to FIGURES 9 and 10, the recording stylus arm 232 is provided with an upwardly-sloping cam surface 240. A cam follower pin 242 projects from the lower end of a rocking arm 244 pivoted at 245 to the carriage 140 and actuated by plunger 246 of record solenoid 248 by way of the connecting link 247. A tension coil spring 250 draws the follower pin 242 toward the sloping cam surface 240, thus normally raising the recording stylus 238 away from the recording disk 39. When the record solenoid 248 atop the carriage 140 is energized, however, the resulting pivotal movement of rocking arm 244 draws cam follower 242 outwardly along the cam surface 240 allowing another tension coil spring 252 to pivot the recording stylus arm 232 about the axis 234 thus moving the stylus 238 downwardly into contact with the recording disk 39.

The playback stylus assembly 230 includes the playback stylus 254 mounted with suitable transducer means on a maximum compliance pickup arm 256 likewise pivoted about the axis 234 and also about a vertical axis 235 for horizontal pivoting freedom of movement in a gimbal mounting 237. Playback arm 256 has a projecting tip 258 protruding through an aperture 260 in the end of the carriage 140 into a V-shaped notch 262 formed in a lifting arm 264 pivotally mounted by means of a dashpot unit 266 upon the end of carriage 140. The lifting arm 264 is also provided with an upstanding lever 268 having a wing 270 projecting toward the solenoids at the opposite end of the carriage 140. A crank link 272 pivotally mounted on a post 274 atop carriage 140 is joined by a connecting rod 276 to a plunger 278 of a playback solenoid 280. The crank link 272 is urged by a resilient spring 279 into engagement with the projecting wing 270 to pivot the lifting arm 264 upwardly, thus normally raising the playback stylus from the recording disk 39.

Energization of a playback solenoid 280 pivots the crank link in a clockwise direction as viewed in FIGURE 9, withdrawing it from wing 270 and allowing a tension coil spring 282 to draw the lifting arm 264 downwardly about the dashpot unit 266 with a slow pivotal motion, damped by the dashpot 266, thus lowering the projection 258 at the tip of playback arm 256 to bring the playback stylus 254 into contact with the recording disk 39.

The normal traversing forward feed provided by the main drive screw 62 will maintain the playback stylus in precise synchronism with the recorded information track on the disk 39. The guide arm 203a (FIGURE 11) is adjusted to nudge the playback arm forwardly when the lowered playback stylus 254 drops on the top of a "land" between two adjacent embossed tracks, and guide arm 203a applies gentle forward pressure upon stylus 254 in its normal centered position. The eccentric stop 281 may be adjusted to limit the action of guide arm 203a. The forward guide arm 203 closes the carriage sensing switch 202 when the playback stylus is moved forwardly relative to the advancing carriage by its tracking movement within a fast spiral groove produced by indexing forward movement of the carriage during previous recording. Since sensing switch 202 is placed in parallel with indexing switch 312 (operated by button 35 shown in FIGURE 1 and discussed in greater detail below with reference to FIGURES 21 and 22) in the playback condition, closing the switch 202 produces corresponding indexing forward movement of the carriage 140 during playback operation. Similar adjustable eccentric stops 283 and 285 are provided for adjustment of the operating limits of the sensing switch 202.

Thus the stylus carriage 140 is a self-contained stylus control mechanism, fully adapted to raise and lower either or both of the styli into operative engagement with the record disk 39. Energization of the solenoids 248 or 280 provides positive stylus control operation via the linkage assemblies 228 and 230, and both styli are automatically raised mechanically when power is cut off from their solenoids.

While brush and contact strip arrangements may be employed to supply current to the control solenoids, in practice looped pairs of insulated stranded fine wire have been found entirely adequate for connecting the solenoids with their control circuits, and such stranded wire will flex freely to accommodate the traversing movement of the stylus carriage 140.

*Viewing Mirror Arrangement*

Figure 19:
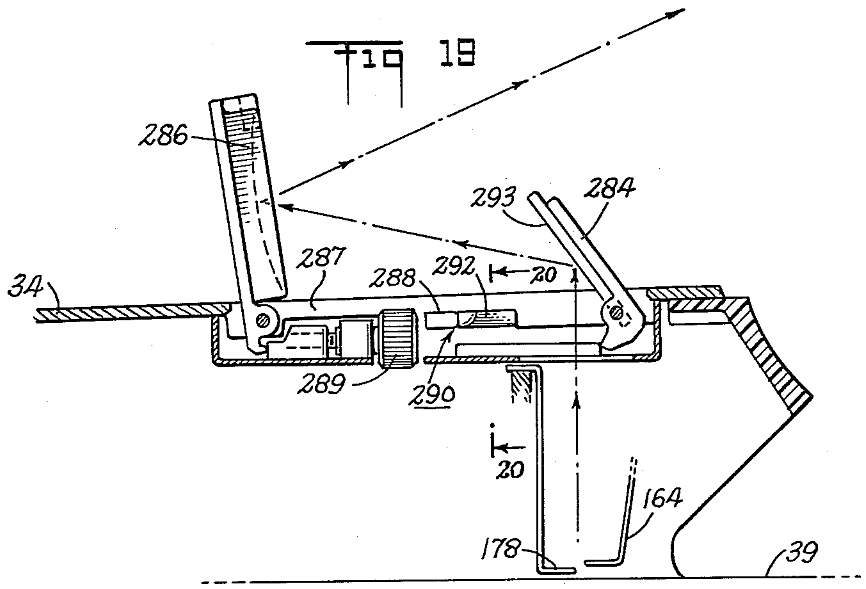
FIGURE 19 is a fragmentary sectional side elevation view of a portion of the top cover of a recorder-reproducer unit of the present invention showing the double mirror viewing arrangement.
Figure 20:
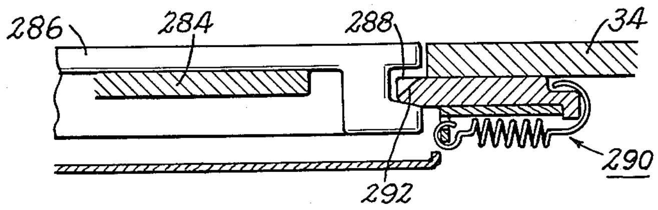
FIGURE 20 is a fragmentary front sectional elevation view of a part of the viewing arrangement of FIGURE 19, taken along the line 20—20 of FIGURE 19.
Figure 12:
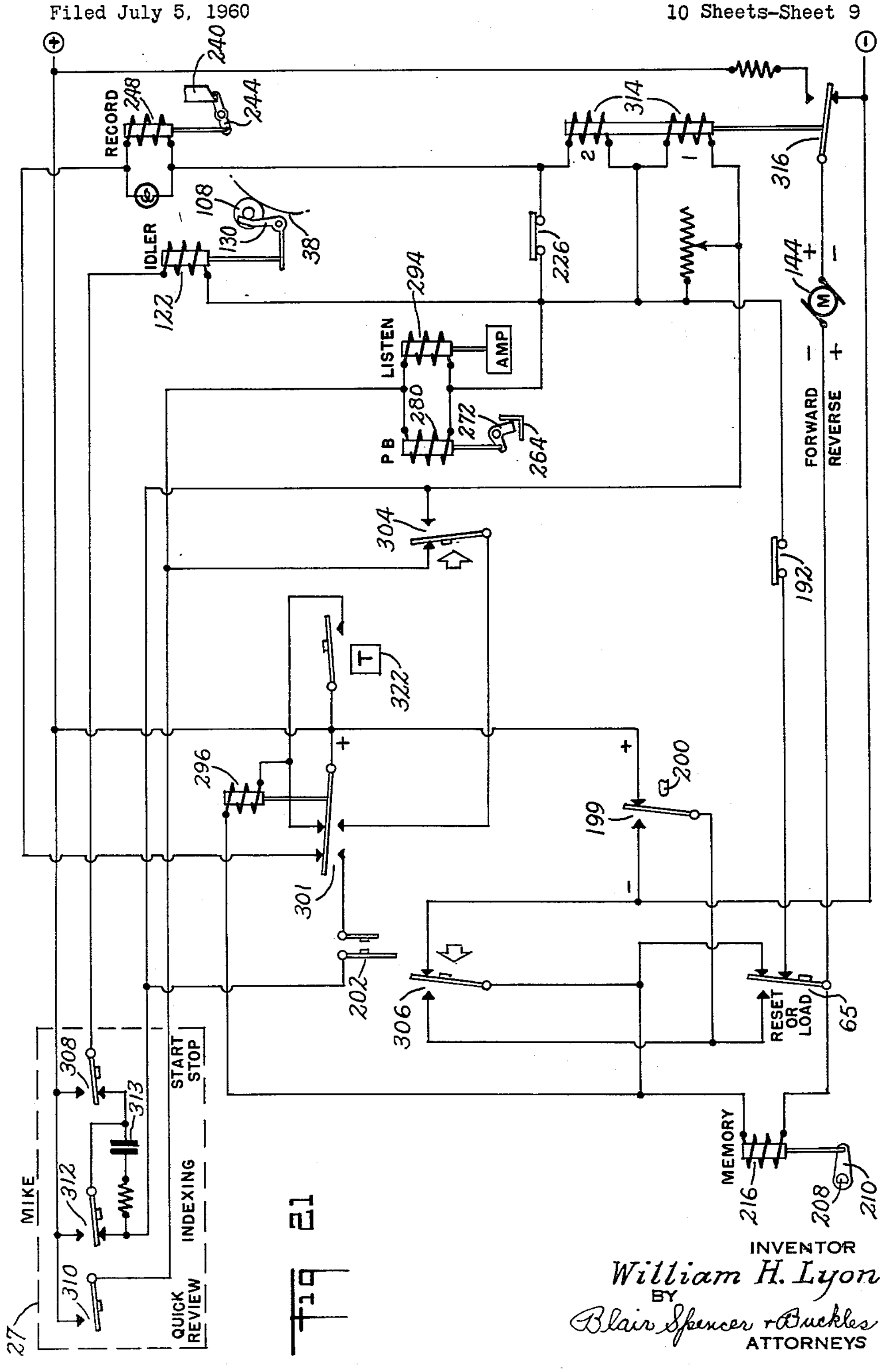

The position indicator viewing arrangement 168 includes two viewing mirrors shown in detail in FIGURES 19 and 20, a forward mirror 284 and a rear mirror 286. These mirrors are both pivotally mounted within an aperture 287 in the top cover 34, and they are adapted to be folded flat and held abutting each other and flush with the top upper surface of the top cover 34 by a catch 290. This catch may be released by depression of the front mirror 284 to allow both mirrors to spring upwardly into their operative positions, actuated by two springs cooperating with the top cover 34 and the respective mirrors. The catch 290 is mounted within top cover 34 at the side of the aperture 287 accommodating the two pivotally-mounted mirrors. Catch 290 is provided with a cam surface 292 cooperating with a corresponding cam-follower surface 293 on mirror 284, which acts to slide the catch element 290 sideways when mirror 284 is depressed into contact with the cam surface 292, thus moving the latch member 288 on catch 290 out of engagement with mirror 286, and permitting pivotal movement of mirror 286 about its supporting pivot for closing or opening past the latch member 288. The forward mirror 284 is positioned in its upward position to reflect an image of the indicator 164, scale 178, and underlying record 39 toward the rear mirror 286, which is adjustably positioned by means of a threaded and knurled adjustment stud 289 mounted in aperture 287 and limiting the pivotal movement of rear mirror 286. The rear mirror 286 may thus be adjusted to direct the reflected image of the indicator 164 to the position most suitable for the eye level of the transcribing typist.

*Control Circuits*

Figure 22:
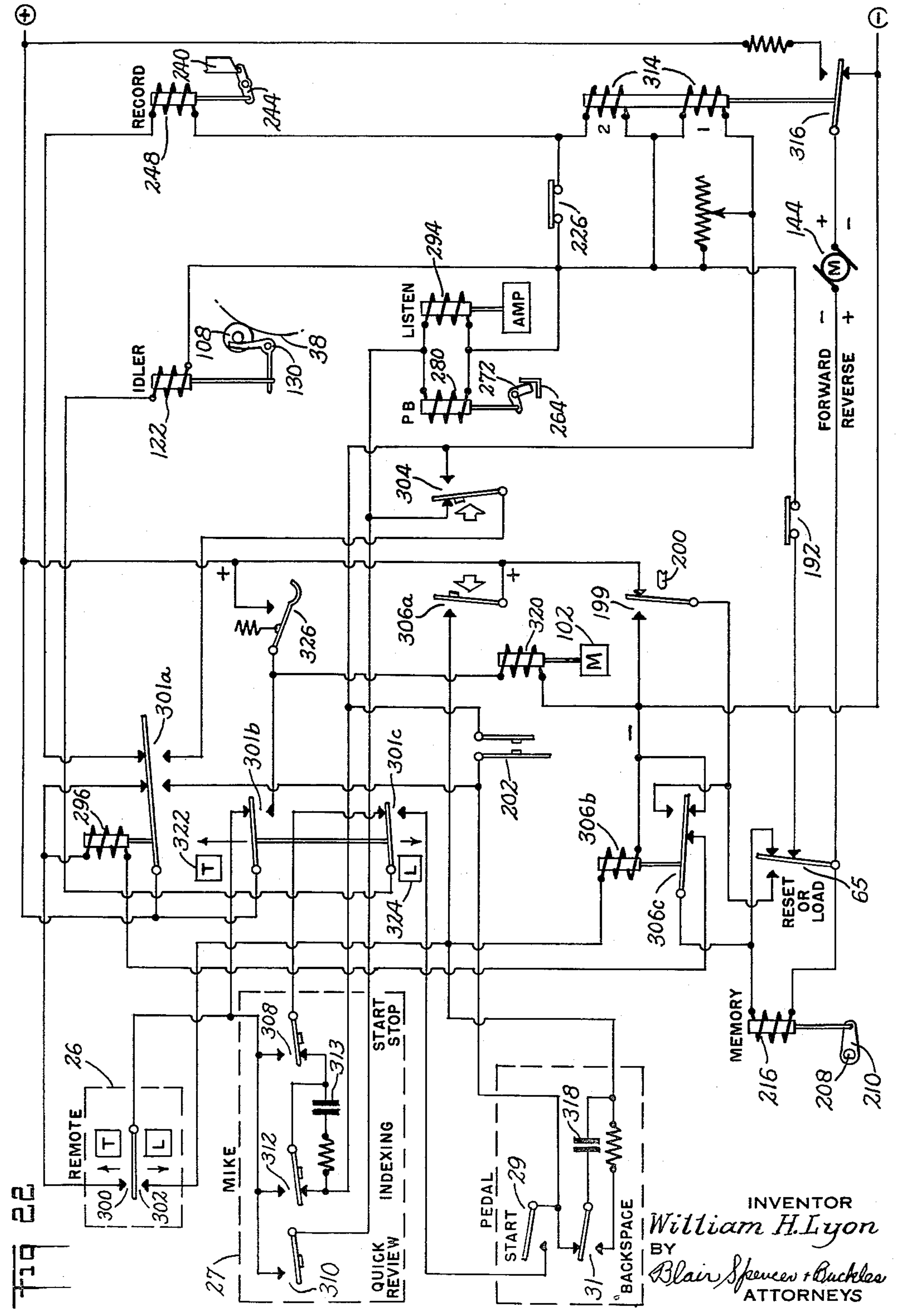
FIGURE 22 is a schematic circuit diagram of the controls and switches employed with a different embodiment of the present invention incorporating a remote dictating and control station.

The schematic circuit diagram of FIGURES 21 and 22 illustrate the control circuits employed with the preferred embodiments of the present invention, but it will be understood that various modified control circuits may be employed to provide the advantages of different control location and function.

The control circuit of FIGURE 21 is used with a recorder-reproducer unit of the present invention when local dictation and control are desired. In this case the operating controls include a talk button 322, a re-set or load switch 65 actuated by the load button 64 (FIGURE 1), a scan-forward switch 304, a scan-backward switch 306, and three switches preferably mounted in the microphone handle, a microphone start switch 308, a quick review switch 310, and an indexing switch 312. It should be noted that only control circuitry is shown in FIGURES 21 and 22, and that the amplifier circuits, the power supply circuits, the main drive motor and line switch and the "amplifier-listen relay" switch contacts connecting the amplifier to the microphone or the speaker are not shown in the schematic circuit diagrams of FIGURES 21 and 22.

*Recording Condition*

The function of the control circuit of FIGURE 21 can best be described by reference to its operation. Momentary depression of the talk button 322 applies D.C. potential to the hold relay 296 by way of the scan-back switch 306, thus holding the talk-listen switch 301 locked in its talk position, and energizing the record solenoid 248 with D.C. potential by way of the normally-closed carriage follow switch 226, the forward limit switch 192, the load switch 65 and the scan-back switch 306. Closing of the microphone start switch 308 similarly applies D.C. potential to the idler solenoid 122, placing the turntable in operation for recording.

Closing of the indexing switch 312 within the microphone charges the capacitor 313 by a surge of current through coil 1 of the control relay 314, raising the control switch 316 to apply a brief surge of D.C. potential with forward polarity to the windings of the control motor 144. When capacitor 313 has completed its charge, the current ceases to flow through the relay, and the control switch 316 drops to apply negative potential to both sides of the control motor 144, causing instant stopping of the motor. The indexing capacitor 313 thus may be substituted for the timing cam 139 shown on the end of the control overdrive screw 138 in FIGURE 13.

Coasting of control motor 144 is avoided and prompt braking is achieved by the relay 314 and switch 316, applying the same D.C. potential to both sides of the motor windings whenever control overdrive scanning operation is stopped.

Playback of the last few items of recorded information during the recording operation is provided by the quick review switch 310, which applies power to the playback solenoid and to a "listen" relay 294 installed in the amplifier and connected when energized to switch the amplifier from record condition to playback condition. Energization of the playback solenoid lowers the playback stylus, which normally tracks several grooves behind the recording stylus, and this interval may be changed by adjusting the eccentric elements 281, 283 and 285 shown in FIGURE 11. Although normal recording feed continues, the playback stylus 254 provides brief "back-spacing playback" while the record stylus 238 embosses a groove with no information therein. Release of the quick review button 33 operates the switch 310 and removes the potential from the playback solenoid 280 and the "listen" relay 294, thus returning the amplifier to record condition for further recording.

The scan-forward switch 304 is inactive when the talk-listen switch 301 is in its "talk" position, since the scan-forward switch normally should not be used until after the scan-back switch 306 has been employed for selective playback. Actuation of the scan-back switch 306 first applies positive potential to both sides of the hold relay 296, releasing the talk-listen switch 301 to its listen position. At the same time a D.C. potential is applied across the control motor 144 with "reverse" polarity, and the control overdrive screw 138 accordingly rotates in the reverse direction as long as the scan-back switch 306 is depressed.

During rapid reverse scanning traverse of the carriage 140, the playback solenoid is de-energized, since both ends are connected to positive potential by way of the scanning switch 304 and the talk-listen switch 301, and the switches 192, 65, 306 and 199. The same is true of the "listen" relay 294 in the amplifier. Accordingly, the playback stylus cannot be in contact with the record disk 39 during rapid scanning movement. If the microphone start switch 308 is depressed, actuation of scan-back switch 306 applies positive potential to both sides of the idler solenoid 122 via switches 65 and 192, thus maintaining the turntable 38 in its stopped position until rapid scanning movement is completed. Release of the scan-back switch 306 puts the circuit in normal playback condition, with the playback solenoid 280 energized to lower the playback stylus 254 into contact with the record, and with the idler solenoid 122 subject to energization by the start switch 308. The record solenoid 248 is of course disconnected by the talk-listen switch 301 during playback.

It is noteworthy that if scan-back switch 306 and scan-forward switch 304 are depressed simultaneously, they each apply positive potential to opposite sides of coil 1 of control relay 314, thus leaving the control switch 316 in its downward position and applying reverse D.C. potential to the control motor 144, producing rapid reverse scanning traverse of the carriage 140.

When selective playback is completed and the machine is to be returned to its recording condition, momentary depressing of the talk button 322 will energize the hold relay 296 to hold the talk-listen switch in its talk position, applying D.C. potential in series across the record solenoid 248 and coil 2 of the control relay 314, since the carriage follow memory switch 226 remains open until the carriage 140 once more moves forward beneath the memory slider 205. The resistance of coil 2 of the control relay 314 is so high that the resulting current flow will not operate record solenoid 248, but the relay 314 operates to raise control switch 316, applying forward potential to the control motor to produce forward scanning traverse of the carriage 140 until the carriage follow switch 226 is closed by the arrival of the carriage 140 at stud 224 under the memory slider 205. When closed, switch 226 shorts coil 2 of the control relay 314, releasing control switch 316 and stopping the control motor 144. The resulting current is then sufficient to operate the record solenoid 248, and the apparatus is in condition for recording as soon as the microphone start switch 308 is depressed to energize the idler solenoid 122.

*Playback Condition*

When the talk-listen switch 301 is moved to its listen position by depression of the scan backward button 306, releasing hold relay 296, the record solenoid is disconnected and the playback solenoid 280 and the listen relay 294 in the amplifier are both connected to D.C. potential via switches 192, 65 and 306. When the microphone start switch 308 is closed to actuate the idler solenoid 122, the turntable will begin rotation for normal playback operation. Scan-back operation by operating the scan-back button 306 de-energizes the playback solenoid 280 and "listen" relay 294, as described above, and applies reverse potential to the control motor 144 so long as the scan-back button is depressed and the outside limit switch is unactuated. While the scan-back button is held depressed the positive potential is applied to both sides of the playback solenoid 280 and the "listen" relay 294, withdrawing the playback stylus from the record disk 39 and muting the listening circuits of the apparatus. When the scan-back switch 306 is released, however, the normal D.C. potential is applied through scan-forward switch 304 across the playback solenoid 280 and the listen relay 294, and when the start switch 308 is actuated, the same D.C. potential is applied to the idler solenoid 122 to begin the playback operation. Actuation of the scan-forward button 304 connects the D.C. potential across coil 1 of the control relay 314 by way of the inside or forward-limit switch 192 and the reverse scan switch 306, thus providing forward scanning movement until the forward-limit switch 192 is opened by the advancing carriage 140.

Actuation of the re-set or load switch 65 applies D.C. potential across the memory solenoid 216, and at the same time applies the reverse potential across the control motor 144, thus providing for rapid backward traverse of the carriage 140 and corresponding backward traverse of the memory slider 205 until the outside or reverse limit switch 199 is actuated by the returning carriage 140, removing the D.C. potential from both the memory solenoid 216 and the control motor 144.

*Remote Control Arrangement*

In the schematic circuit diagram of FIGURE 22, the basic control circuit of FIGURE 21 has been modified to provide operational control from a remote station, together with local control by the transcribing typist at the recorder-reproducer unit. The carriage positioning controls are generally the same as those shown in FIGURE 21, but a two-part ganged "local talk-listen" switch 301*b* and 301*c* is provided in the local unit 30. The switch section 301*b* connects the remote station into the circuit for system operation from the remote talk key 300 or the remote listen key 302, each of which moves the arm of a normally open double throw switch into momentarily closed condition. The relay switch 301*a* performs the same functions as the switch 301 in FIGURE 21, and the hold relay 296 is energized by the momentary closing of the remote talk key 300.

The remote "listen" key 302 supplies D.C. potential to a scan-back solenoid 306*b* which actuates a scan-back switch 306*c* corresponding to the scan-back switch 306 in FIGURE 21. A local scan-back button 306*a* is also present in the circuit of FIGURE 22 for local actuation of the scan-back solenoid 306*b*. Switch section 301*c* in its upper or talk position connects the remote microphone for the remote control over starting by energizing idler solenoid 122, indexing of carriage 140, or quick review operation of the playback stylus. In its lower or "listen" position, switch section 301*c* connects the local pedal switches 29 and 31 for alternative starting energization of the idler solenoid 122 by start pedal 29, or the back spacing of the carriage 140 by operation of the backspace pedal 31 to direct a brief surge of current through the backspace relay 306*b*, resulting from the discharge of the backspace capacitor 318.

Since the main drive motor 102 must be started from either remote or local control positions, the second section 301*b* of the talk-listen multiple switch applies D.C. potential to a control motor relay 320 in its lower or "listen" position. When energized, the relay 320 connects power to the main drive motor 102 and to the lamp 179 in the local unit 30. When the switch section 301*b* is in its upper or "talk" position, the same D.C. potential is applied to the control motor relay 320 by removal of the microphone from the remote hook switch 326.

When a plurality of remote stations are employed with a single recorder-reproducer unit, as shown in FIGURE 1, a "privacy relay" is preferably installed in each remote station, connected with the microphone switches 326 therein. In such a manner that the lifting of any microphone from its hook switch 326 automatically actuates these privacy relays to remove all other remote stations from control connections until the first-lifted microphone has been replaced on its hook switch.

The fully-automatic control of the carriage 140 and the two styli mounted thereon through manual actuation and automatic control switching as shown in the circuit diagrams of FIGURES 20 and 21 provides all the advantages of automatic operation, together with the flexibility of manual actuation by the operator either at the recorder-reproducer unit or at a remote station. The automatic repositioning of the carriage 140 and the memory slider 205 together permit many selective playback operations without disturbing the continuity of recorded information. The local and remote control functions are reduced by this invention to the barest essentials—scan back, scan forward and start. At the remote station, the necessary amount of forward scanning is automatically provided after the talk key is once depressed. The local operator may scan forward across the entire recording, however, to facilitate playback of any selected part of a completed recording. The added functions of quick review and index-spacing of recording tracks are also conveniently available to the remote operator, while the local operator may backspace the playback stylus upon command.

Thus the advantages of tape recorders in control and selective playback have been combined with the desirable features of disk dictation recording, including the clearly visible groove structure showing the local operator the exact position in the recording at all times.

Remotely controllable recorder-reproducer units such as those described above may be combined in various ways for use in centralized dictation systems. The remote stations and microphones, for example, may be incorporated in telephone desk sets, and many recorder-reproducer units may be operated at a central recording station with suitable switching and signaling apparatus to provide fully automatic remotely controlled recording and playback.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention, which, as a matter of language, might be said to fall therebetween.

I claim:

1. In information recording or reproducing equipment, a traversing drive mechanism for a transducer support member movably mounted on a frame comprising the combination of a threaded drive screw journaled in said frame, a threaded control screw journaled in said frame and substantially parallel to said drive screw, separate drive means for rotating said screws, a carriage slidably mounted on said frame for traversing movement substantially parallel to said drive screw, means connecting said support member and said carriage, and a toothed pinion engaged with both of said screws and rotatably mounted on said carriage, whereby traversing movement of said carriage in a preselected direction and at a preselected rate may be achieved to provide normal feed movement and scanning overdrive movement of said transducer support member.

2. In information recording or reproducing equipment, a traversing drive mechanism for a transducer support member movably mounted on a frame comprising the combination of a threaded drive screw journaled in said frame, a threaded control screw journaled in said frame and substantially parallel to said drive screw, separate drive means for rotating said screws, a carriage slidably mounted on said frame for traversing movement substantially parallel to said drive screws, means connecting said support member and said carriage, separate control means for independently controlling the rotation of each of said screws, and a toothed pinion engaged with both of said screws and rotatably mounted on said carriage, whereby traversing movement of said carriage in a preselected direction and a preselected rate may be achieved to provide normal feed movement and scanning overdrive movement of said transducer support member.

3. In information recording or reproducing apparatus, the combination of a frame, a record member, an information transducer, a drive screw journaled on said frame and connected to produce relative normal feed movement between said transducer and said record member for normal continuous recording or information retrieval, a reversible overdrive control screw journaled on said frame and connected to produce relative reverse scanning movement between said record member and said transducer for selective information retrieval and relative forward scanning movement for subsequent recording, gear means engaged with both said screws, and drive means coupled with said screws for actuating said gear means in response to the combined rotations of said drive screw and said feed screw to provide said normal feed movement or said scanning movement upon command.

4. In information recording or reproducing apparatus, the combination of a frame, a record member, an information transducer, a drive screw journaled on said frame and connected to produce relative normal feed movement between said transducer and said record member for normal continuous recording or information retrieval, a reversible overdrive control screw journaled on said frame and connected to produce relative reverse scanning movement between said record member and said transducer for selective information retrieval and relative forward scanning movement for subsequent recording, and gear means cooperatively engaged with both of said screws for transmitting said normal feed movement and said reversible scanning movement.

5. In information recording or reproducing apparatus, the combination of a frame, a record member, an information transducer, drive means supported on said frame for providing relative normal feed movement between said transducer and said record member for normal continuous recording or information retrieval, reversible scanning overdrive means for providing relative reverse scanning movement between said record member and said transducer for selective information retrieval and relative forward overdrive movement for subsequent recording, a reference member movably mounted on said frame for advancing movement corresponding to said relative normal feed movement, a gripping element for maintaining said reference member in successive advanced positions, and contacting members positioned to be actuated by said forward scanning overdrive movement overtaking said relative normal feed movement for limiting said relative forward scanning movement to condition said apparatus for subsequent recording.

6. In information recording or reproducing apparatus, the combination of a frame, a record member, an information transducer, a drive screw journaled on said frame for providing relative normal feed movement between said transducer and said record member for normal continuous recording or information retrieval, a reversible overdrive control screw journaled on said frame for providing relative rapid reverse scanning movement between said record member and said transducer for selective information retrieval and relative rapid forward scanning movement for subsequent recording, a reference member movably mounted on said frame for advancing movement corresponding to said relative normal feed movement, a gripping element for maintaining said reference member in successive advanced positions, and contacting members positioned to be actuated by said forward scanning overdrive movement overtaking said relative normal feed movement for limiting said relative forward scanning movement to condition said apparatus for subsequent recording.

7. In information recording or reproducing apparatus, the combination of a frame, a record member, an information transducer, drive means supported on said frame for providing relative normal feed movement between said transducer and said record member for normal continuous recording or information retrieval, reversible scanning overdrive means for providing relative reverse scanning movement between said record member and said transducer for selective information retrieval and relative forward overdrive movement for subsequent recording, a reference member movably mounted on said frame for advancing movement corresponding to said relative normal feed movement, a releasable gripping element for maintaining said reference member in successive advanced positions, contacting members positioned to be actuated by said forward scanning overdrive movement overtaking said relative normal feed movement for limiting said relative forward scanning movement to condition said apparatus for subsequent recording, and releasing means cooperatively connected to release said reference member upon initiating a succeeding cycle of operations.

8. The combination defined in claim 7 in which said releasing means includes a solenoid mounted on said frame and connected to release said releasable gripping means, whereby said reference member may be returned to its starting position.

9. The combination defined in claim 7 in which said reference member and said releasable gripping means are both slidably supported by a pair of rods spanning said frame, one of said rods being journaled for pivotal movement in said frame and being irregular in cross section, said gripping means having an aperture formed therein accommodating said irregular pivotal rod, said pivotal rod having a first position in which said clamping means is frictionally engaged and a second position in which said clamping means is released by said pivotal rod, and means for pivotally moving said rod to release said gripping means.

10. Place-finding means in a recording machine for automatically returning the transducer means to the last-recorded portion of the record following a reprise playback of any previously-recorded portion comprising, in combination, transducer means relatively movable with respect to a record member, a transducer follower movable in a predetermined direction by engagement with said transducer means during recording, locking means for retaining said follower in any position to which it is advanced by said transducer means, control means for reversing the direction of relative motion between said transducer means and said record member to return to any selected position for playback of selected portions of said record, whereby said transducer means is disengaged from said follower, means for driving said transducer means into return engagement with said follower upon conclusion of reprise playback, and switch means operable by engagement of said transducer means with said follower to interrupt operation of said return driving means and to condition said transducer means for recording.

11. The combination of claim 10 including means for unlocking said transducer follower upon the completion of recording and means for returning said unlocked follower and transducer to an initial starting position preparatory to commencing a new recording.

12. In recording or reproducing apparatus the combination of a frame, a record-supporting turntable rotatably supported on said frame, a motor means to rotate said turntable, a slidable carriage indexably mounted for radial movement in relation to said turntable, a playback stylus and a record stylus, each stylus being supported by said carriage in operative relationship with a recording disk on said record-supporting turntable, movable traversing drive means coupled to said turntable for motion therewith, said traversing drive means being connected between said carriage and said frame to provide normal traversing movement of said carriage upon rotation of said turntable, a reversible overdrive motor, and traversing overdrive means coupled to said reversible overdrive motor for motion therewith, said traversing overdrive means being connected between said carriage and said frame to provide selective repositioning of said carriage, whereby signals supplied to said recording stylus will record information upon said recording disk and whereby said recorded information may be selectively retrieved by said playback stylus upon command.

13. A drive mechanism for recording or reproducing apparatus comprising in combination, a frame, a record-supporting turntable rotatably mounted on said frame, driving means including a driven spindle rotatably supported by said frame adjacent said turntable, a rotatable idler member positioned adjacent said driven spindle and said turntable for providing a driving connection therebetween, a yoke pivotally mounted on said frame and supporting said idler member, resilient means joining said frame with said yoke and urging said idler member out of engagement with said driven spindle and said turntable, a solenoid-actuated linkage for overcoming the urging of said resilient means to move said idler member into engagement, and a turntable brake movably mounted on said frame and connected with said solenoid-actuated linkage to be applied upon actuation of said linkage to brake said turntable, whereby said turntable is alternatively braked or rotatably driven by said idler member.

14. In information recording or reproducing apparatus, the combination of a frame, a record-supporting member movably mounted on said frame, a normal forward drive screw and a return drive screw both journaled in said frame, drive means for rotating said screws, a movable carriage mounted on said frame and engaged with said drive screws for movement in relation to said record-supporting member, transducer means mounted on said carriage for engaging a record member supported by said support member to transfer information signals between said transducer means and said record member, automatic position means storing the position of furthest advance to which said carriage has moved, and control means connected to operate said drive means in response to the position information stored in said position means to move said carriage from an intermediate position to said position of furthest advance in response to a command signal.

15. In information recording or reproducing apparatus, the combination of a frame, a record-supporting member movably mounted on said frame, a forward drive screw and a return drive screw journaled parallel to each other in said frame, drive means for rotating said screws, a movable carriage mounted on said frame for movement in relation to said record-supporting member, a pinion engaged with each of said drive screws and rotatably supported by said carriage, transducer means mounted on said carriage for engaging a record member supported by said support member to transfer information signals between said transducer means and said record member, automatic position means storing the position of furthest advance to which said carriage has moved, and control means connected to operate said drive means in response to the position information stored in said position means to move said carriage from an intermediate position to said position of furthest advance in response to a command signal.

16. In recording or reproducing apparatus the combination of a frame, a record-supporting turntable rotatably supported on said frame, a slidable carriage indexably mounted for radial movement in relation to said turntable, a playback stylus and a record stylus, each stylus being supported by said carriage in operative relationship with a recording disk on said record-supporting turntable, traversing drive means connected between said carriage and said frame to provide normal traversing movement of said carriage, and traversing overdrive means connected between said carriage and said frame to provide selective repositioning of said carriage, said traversing drive means including a drive screw journaled for rotation spanning said frame, said traversing overdrive means including an overdrive screw substantially parallel to said drive screw and journaled for rotation spanning said frame, with said slidable carriage being provided with a pinion rotatably depending therefrom and engaged with both said drive screws.

17. The combination defined in claim 16 in which said turntable is connected in driving engagement with said drive screw, whereby rotation of said turntable provides substantially synchronized rotation of said drive screw to produce traversing feed of said slidable carriage.

18. The combination defined in claim 16 in which a drive member is rotatably journaled in said frame for driving engagement with said record-supporting turntable and in which said drive screw is connected to be driven by said drive member.

19. The combination defined in claim 18 in which said drive member is connected to rotate a worm, and in which a pinion is drivingly secured to said drive screw and engaged with said worm to provide a driving connection between said worm and said drive member.

20. The combination defined in claim 18 in which said drive member includes a transverse torque rod, with said turntable having a central slotted spindle movable into engagement with said torque rod for transmitting driving torque from said turntable to said drive screw.

References Cited in the file of this patent

UNITED STATES PATENTS

| | | |
|---|---|---|
| 2,391,897 | Harrington | Jan. 1, 1946 |
| 2,533,359 | Dann | Dec. 12, 1950 |
| 2,610,062 | Bratton | Sept. 9, 1952 |
| 2,766,990 | Balmer | Oct. 16, 1956 |
| 2,803,466 | De Napoli | Aug. 20, 1957 |
| 2,973,967 | Freeman | Mar. 7, 1961 |
| 2,976,048 | Silverman | Mar. 21, 1961 |